Patented Feb. 21, 1950

2,498,617

UNITED STATES PATENT OFFICE 2,498,617

POLYGLYCOL PRODUCTS

Earl W. Gluesenkamp, Centerville, Ohio, assignor to Monsanto Chemical Company, St. Louis, Mo., a corporation of Delaware No Drawing. Application July 2, 1947,
Serial No. 758,719

4 Claims. (Cl. 260—306)

The present invention provides products having the general formula:

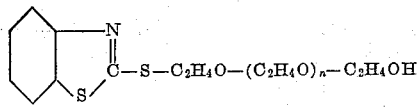

where $n$ is an integer having any value between 3 and 28.

The present products are valuable as inhibitors for the acid pickling of iron or steel products, since they effectively control the dissolution of metallic iron and other metals while accelerating the solution of oxides thereon. The use of these products as inhibitors is disclosed and claimed in application Serial No. 758,729, filed of even date herewith in the name of Richard O. Zerbe and assigned to the same assignee as the present case. The products may also be employed as wetting agents and detergents as herein disclosed. The present products are prepared by adding ethylene oxide either in the gaseous or liquid form to molten 2-mercaptobenzothiazole and continuing the addition until at least 5 mols, but less than 31 mols, of ethylene oxide have combined with each mol of mercaptobenzothiazole. The combination of ethylene oxide and mercaptobenzothiazole in order to form the polyethylene glycol products is favored by the presence in the reacting mass of a small amount of alkali such as sodium or potassium hydroxide.

The following examples are given by way of illustration for the present invention:

Example 1

167 grams of mercaptobenzothiazole melting at 177°–179° C., and 0.9 gram of powdered KOH were placed into a suitable vessel fitted with an ethylene oxide inlet tube and also with a stirrer. The mercaptobenzothiazole was heated to the melting point and then to the temperature of about 200° C. A stream of gaseous ethylene oxide was passed in through the inlet tube until 396 grams (9 mols) had combined. The ethylene oxide absorption in the molten mercaptobenzothiazole is practically quantitative. The product recovered weighed 563 grams and was a dark brown liquid when at room temperature. The product produced corresponds to the formula above when $n$ equals 7. The product was soluble in 5% $H_2SO_4$.

Example 2

172 grams of mercaptobenzothiazole of 97% purity and 0.9 gram of powdered KOH was treated with ethylene oxide in the apparatus and in the manner described in Example 1 above. A total of 440 g. (10 mols) of ethylene oxide was combined in the product. The product corresponds to the formula given above when $n$ equals 8. The product was soluble in 5% $H_2SO_4$.

Example 3

172 grams of mercaptobenzothiazole of 97% purity and 1.0 gram of powdered NaOH was treated with 660 grams (15 mols) of liquid ethylene oxide by forcing the liquid ethylene oxide into a closed pressure vessel containing the mercaptobenzothiazole, which had previously been heated to slightly above the melting point. The reacting mass was stirred with an efficient stirrer. A total of 832 g. of a dark brown liquid was recovered. The product corresponds to the formula given above when $n$ equals 13.

Example 4

Two pounds of powdered KOH was added to 344 pounds of mercaptobenzothiazole of 97% purity, the mixture heated to 190° C. and then treated with 880 pounds of liquid ethylene oxide while stirring. A total of 1224 pounds of a dark brown liquid product was obtained. The product corresponds to the formula given above when $n$ equals 18.

Example 5

Two pounds of powdered NaOH was added to 344 pounds of mercaptobenzothiazole of about 97% purity. The product contained in a pressure vessel was heated to 200° C. and then 1320 pounds of liquid ethylene oxide forced into the vessel while stirring the contents. The product formed almost immediately and the reaction yielded a total of 1664 pounds of product. The product corresponds to the formula given above when $n$ equals 28. The product is soluble in dilute HCl.

As an example of use of the present products as a detergent, a 0.2% by weight aqueous solution of the product of Example 3 above was tested on soiled fabrics according to the method described by Jay C. Harris in Soap and Sanitary Chemicals for August and September of 1943. The hard water employed in the test had a hardness of 300 P. P. M. and the soft water a hardness of 50 P. P. M. The detergent was employed in a concentration of 0.2%. The results were reported by comparing the effectiveness of the present detergent with that of Gardinol WA (sodium lorol sulphate), the value of which was taken as 100%.

When employing the product of Example 3 as a detergent, the relative detergent efficiency in soft water was 64%, while in hard water it was 69%. A built detergent was then prepared utilizing as the active ingredient the product of Example 3. The builder and the composition of the built detergent expressed in weight per cent was as follows:

| | Per cent |
|---|---|
| Product of Example 3 | 20 |
| Starch | 40 |
| Tetrasodium pyrophosphate | 40 |
| Total | 100 |

Upon testing the built detergent of the composition given according to the Harris method described above, the test in soft water indicated for the product a relative detergency of 105%, while in hard water the relative detergency was 116%.

The mercaptobenzothiazole employed may either be the pure compound having a melting point of 177–9° C., or may be the commercially available product which usually has a purity of 97%, and which melts at a temperature of about 175° C. Because of the relative cheapness and availability of the commercial product I prefer to use such commercial product for the preparation of the present compositions.

Various other builders such as sodium carbonate, trisodium phosphate, sodium sulfate, sodium metaphosphate, sodium tripolyphosphate or sodium tetraphosphate may also be used as components of the builder and in various proportions as may be desired.

What I claim is:

1. The product having the formula:

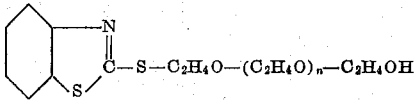

where $n$ is an integer having a value between 3 and 28.

2. The product having the formula:

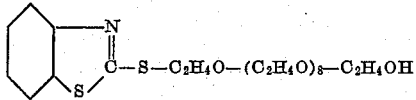

3. The process which comprises passing ethylene oxide into mercaptobenzothiazole at a temperature above the melting point of said mercaptobenzothiazole until at least 5 mols, but less than 31 mols, of ethylene oxide have combined therewith.

4. The process which comprises passing ethylene oxide into mercaptobenzothiazole at a temperature above the melting point of said mercaptobenzothiazole until 10 moles of ethylene oxide have combined therewith.

EARL W. GLUESENKAMP.

REFERENCES CITED

The following references are of record in the file of this patent:

UNITED STATES PATENTS

| Number | Name | Date |
|---|---|---|
| 2,070,523 | Clifford | Feb. 9, 1937 |
| 2,129,709 | Scheutte | Sept. 13, 1938 |
| 2,205,021 | Scheutte | June 18, 1940 |
| 2,402,878 | Doumani | June 25, 1946 |